United States Patent
Jackson et al.

(10) Patent No.: US 7,130,624 B1
(45) Date of Patent: Oct. 31, 2006

(54) SYSTEM AND METHOD FOR DESTABILIZING IMPROVISED EXPLOSIVE DEVICES

(76) Inventors: Richard H. Jackson, 1835 Sixty-third St. East, Inver Grove Heights, MN (US) 55077; John H. Thomas, III, 524 Maple St., Mahtomedi, MN (US) 55115

(*) Notice: Subject to any disclaimer, the term of this patent is extended or adjusted under 35 U.S.C. 154(b) by 483 days.

(21) Appl. No.: 10/712,841

(22) Filed: Nov. 12, 2003

(51) Int. Cl.
 *H04M 3/00* (2006.01)
(52) U.S. Cl. .................................... 455/420
(58) Field of Classification Search ................. 455/420
 See application file for complete search history.

(56) References Cited

U.S. PATENT DOCUMENTS

| | | | |
|---|---|---|---|
| 4,700,629 A | 10/1987 | Benson et al. | |
| 4,884,506 A | 12/1989 | Guerreri | |
| 5,274,356 A | 12/1993 | Taricco | |
| 5,503,059 A | 4/1996 | Pacholok | |
| 5,668,342 A | 9/1997 | Discher | |
| 5,747,719 A | 5/1998 | Bottesch | |
| 5,856,803 A | 1/1999 | Pevler | |

OTHER PUBLICATIONS

Dee Depass, newspaper story from startribune.com, published and accessed May 20, 2005, titled "Alliant tests device to stop Iraqi bombs".

*Primary Examiner*—William D. Cumming
(74) *Attorney, Agent, or Firm*—Walter K. Roloff

(57) ABSTRACT

A system for destabilizing improvised explosive devices includes a radio transmitter means for generating a radio signal having (i) a selected carrier frequency, (ii) a selected amplitude modulation frequency, (iii) a selected peak power output, and (iv) a selected transmit duration. A directional antenna means is coupled to and fed by the radio transmitter means, for directing the radio signal onto a suspected improvised explosive device. The radio signal, upon being directed onto the suspected improvised explosive device, causes detonation of the device.

11 Claims, 2 Drawing Sheets

SYSTEM AND METHOD FOR DESTABILIZING IMPROVISED EXPLOSIVE DEVICES

FIELD OF THE INVENTION

The present invention relates generally to selective destruction of explosive devices. The invention relates specifically to a system and method for destabilizing improvised explosive devices, by way of electromagnetic disruption to trigger the device.

BACKGROUND OF THE INVENTION

In 1967, during the Vietnam War, the United States Naval aircraft carrier U.S.S. Forrestal experienced a catastrophic accident. Specifically, a "Zuni" rocket was accidentally fired from an aircraft about to be launched from the carrier, which resulted in ignition of a fuel fire that nearly destroyed the carrier. It was later discovered that the Zuni rocket's motor had, without command of pilot or crew, ignited. The ignition of the electrically triggered rocket motor was then determined to be a result of electromagnetic interference and consequential triggering effect from the carrier's radar.

Other instances of accidental triggering have been experienced in mining and civil engineering projects, where radio frequency interference has caused uncommanded detonation of blasting caps and other explosives used at such locations.

Since the Forrestal accident, all ordnance that employs electric triggering devices is designed and tested under rules which govern electronic packaging and shielding for minimizing electromagnetic effects thereon. In mining projects and the like, a protocol of prohibiting radio transmissions anywhere in proximity to the site has been strictly enforced.

Electrically triggered explosives are well known, and have unfortunately been successfully utilized by individual terrorists, terror organizations, and other criminals without warning for destruction of military and civilian targets alike.

These criminals have frequently utilized crudely made or so-called "improvised" explosive devices to carry out their despicable acts. These improvised explosive devices are commonly constructed from commercially available components and are assembled with little technical expertise. Such improvised devices are typically simple in their construction, comprising a package or housing containing explosives, an electronic detonator to ignite the explosives, a timer or manually operated switch to trigger the detonator, and a battery to power the electronic components. Improvised devices are, due to their simplicity, easily concealed and therefore there has been virtually no defense against them.

Therefore, it would be desirable to utilize what was tragically learned from accidents like that of the Forrestal, to combat the use of improvised explosive devices.

SUMMARY OF THE INVENTION

An object of the present invention is to provide a system and method for destabilizing improvised explosive devices, by utilization of what was learned from the aforementioned accidents.

In accordance with the present invention, a system for destabilizing improvised explosive devices includes a radio transmitter means for generating a radio signal having (i) a selected carrier frequency, (ii) a selected amplitude modulation frequency, (iii) a selected peak power output, and (iv) a selected transmit duration. A directional antenna means is coupled to and fed by the radio transmitter means, for directing the radio signal onto a suspected improvised explosive device. The radio signal, upon being directed onto the suspected improvised explosive device, causes detonation of the device.

DETAILED DESCRIPTION OF THE INVENTION

Figure 1:
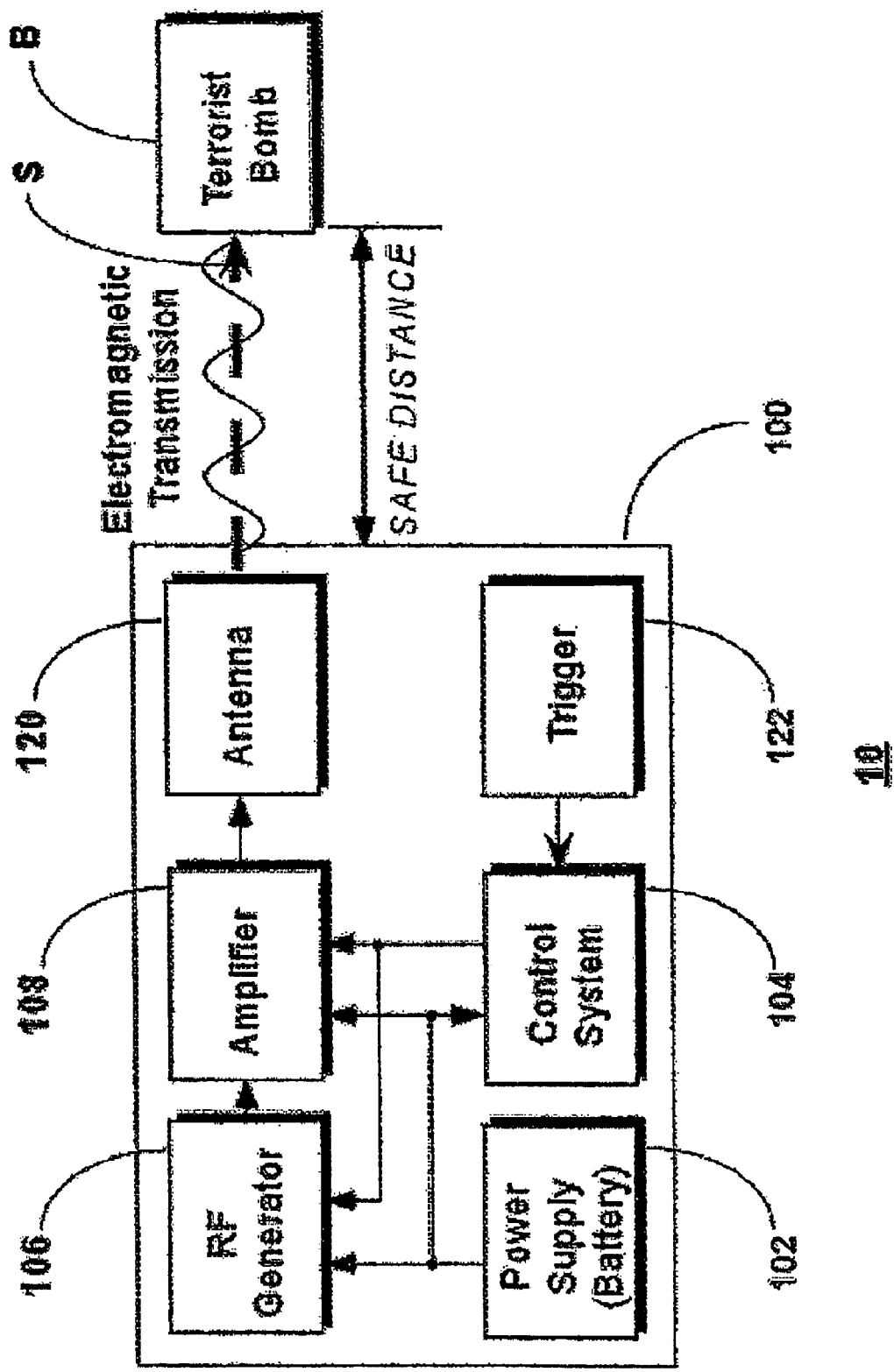
FIG. 1 is a schematic diagram of a system for destabilizing improvised explosive devices, constructed in accordance with the present invention.

Referring to the figure, there shown is an exemplary embodiment of a system for destabilizing improvised explosive devices 10 (hereinafter, "system 10") of the present invention.

As used here throughout, the term "improvised explosive device" is intended to include any simple, unsophisticated, and/or crudely made explosive device, which (i) is electrically operated, actuated, or triggered, (ii) does not have any appreciable shielding against electromagnetic effects, and (iii) is mainly constructed from commercially available components. A typical improvised explosive device would, as aforementioned, include a package or housing containing explosives, an electronic detonator to ignite the explosives, a timer or manually operated switch to trigger the detonator, and a battery to power the electronic components.

In the figure, system 10 includes a radio transmitter means 100 for generating a radio signal S, and a directional antenna means 120 coupled to radio transmitter means 100 for transmission of radio signal S onto a suspected improvised explosive device as will be further described.

Radio transmitter means 100 preferably includes a power supply 102 (e.g., a commercially available 12 V battery in combination with suitable power conditioning to develop a selected voltage), control electronics 104, a radio frequency ("RF") transmitter generator 106, and an amplifier 108. Radio transmitter means 100 further includes a trigger 122 for initiating operation of system 10, as will be further described.

Radio signal S as generated by transmitter means 100, is characterized by a selected very high carrier frequency, a selected and significantly lower amplitude modulation frequency, a selected peak power output, and a selected transmit duration. In a preferred embodiment:

The selected carrier frequency is in a range of 1 GHz to 4 GHz;

The selected amplitude modulation frequency is approximately 50 MHz;

The selected peak power output is in a range of 1 KW to 2 KW; and

The selected transmit duration is in a range of 50 ms to 100 ms.

The selected amplitude modulation frequency is characterized by a time varying, asymmetrical pulse width.

Directional antenna means 120 comprises, preferably, an antenna having a relatively small, solid angle of emission. Antennas of this specification include parabolic reflective antennas, focusing antennas, and aperture antennas.

In operation of system 10, an operator (not shown) actuates trigger 122, which causes radio transmitter means 100 to generate radio signal S which is then fed to directional antenna means 120. Directional antenna means 120 then acts to direct signal S onto a suspected improvised explosive device B (a terrorist bomb, in the figure). Signal S, characterized by the aforementioned range of values, is a high power signal having a relatively short transmit duration or "on cycle". During this on cycle, signal S is further modulated by transmitter means 100 to create a complex broadband signal. The complex broadband signal S, directed onto improvised explosive device B, causes electromagnetic disruption within electronics of device B, and thereby premature and uncommanded triggering and detonation thereof. Signal S, however, does not expose the operator of system 10 or other nearby third parties to any harmful dosage of electromagnetic radiation. Particularly, the dosage of radiation delivered by signal S is low because the on cycle is short as aforesaid.

For ease of use and portability, transmitter means 100 is preferably designed in terms of size and weight to be capable of being carried within a portable backpack (not illustrated) while antenna 120 is preferably a hand-held unit (also not illustrated).

Figure 2:
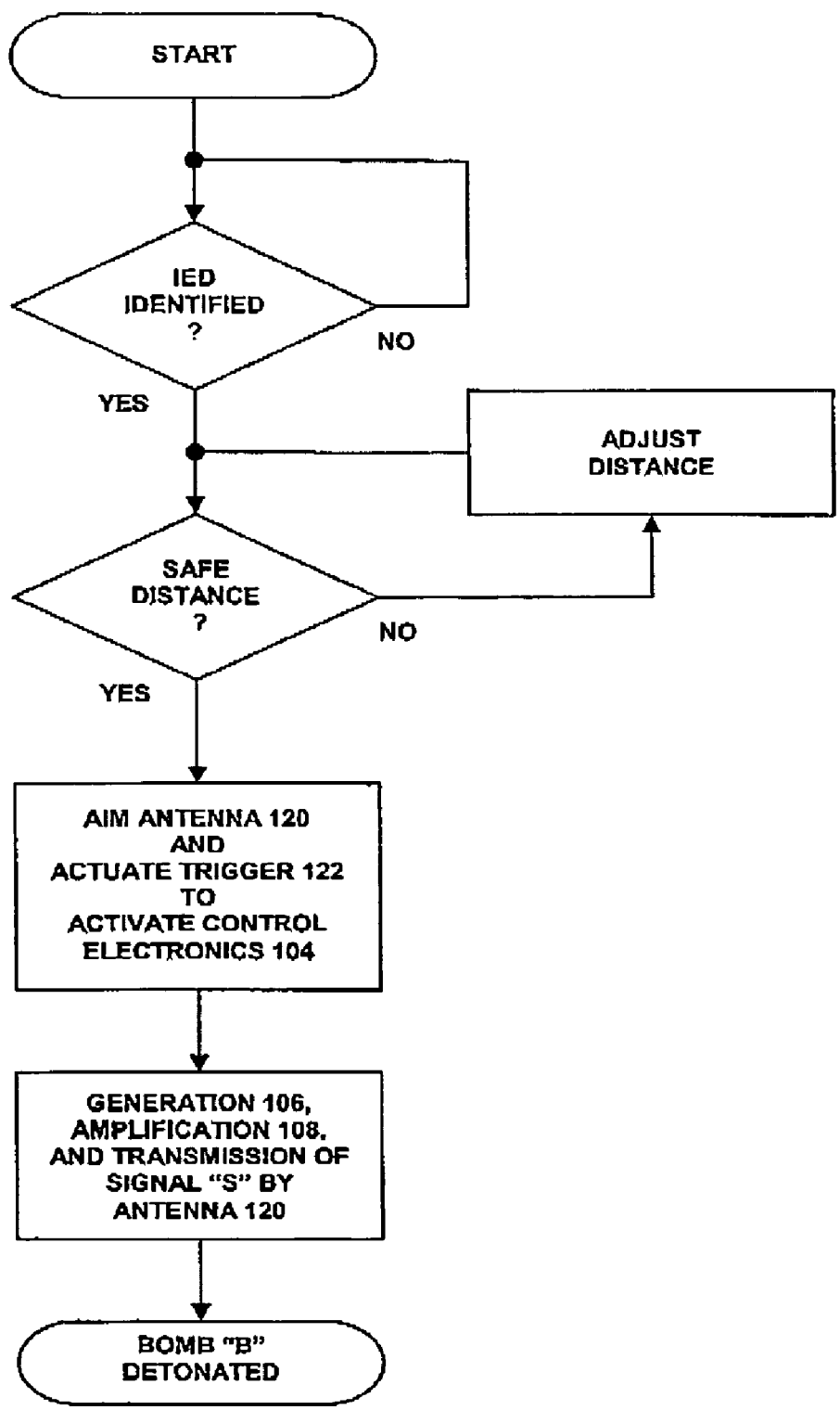
FIG. 2 is a flow diagram of a method for destabilizing improvised explosive devices, in accordance with the present invention.

As an example of use of system 10, with reference to FIG. 2, a suspected improvised explosive device B is identified by way of military or law enforcement intelligence. After ensuring that a safe distance exists between suspected device B and the operator, the operator actuates trigger 122 of means 100 while aiming antenna means 120 at suspected device B. Trigger 122 in turn, actuates control electronics 104. Control electronics 104, powered by power supply 102, causes generator 106 (also powered by supply 102) and amplifier 108 to generate, amplify, and send signal S to antenna means 120. Antenna means 120, having been aimed at suspected device B, directs signal S onto device B. Radio signal S then causes premature and uncommanded detonation of device B by way of the electromagnetic disruption and triggering effect thereon, as aforedescribed.

It is to be appreciated that system 10 may be operated without a criminal organization knowing or understanding why their improvised explosive devices will not function correctly (i.e., why they are prematurely detonating) since signal S is not visible and is, in use, directed onto such devices at a distance from transmitter and antenna means 100 and 120. Therefore, it is to be reasonably expected that without engineering expertise or design sophistication, as is usually the case, the criminal organization will fail to take any corrective action (e.g., adding electromagnetic shielding) in subsequent device fabrication.

In exemplary system 10, it is to be understood that various suitable components may be substituted for those depicted and described. For example, a particular selection of generator 106 could obviate any need for amplifier 108, since some RF generators operating in the aforedescribed frequency range do inherently generate enough RF output power to produce the aforedescribed signal S. A magnetron, for example, is a generator that produces a high output power. Thus, in some embodiments of the invention, amplifier 108 could be omitted entirely from system 10.

It is also to be appreciated and understood that as used here throughout, reference to any "amplitude modulation" specifically includes pulse modulation.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired results, or that various accessories may be added thereto.

Lastly, the choice, of course, of compositions, sizes, and values of various aforementioned components of the present invention are all a matter of design choice depending upon intended uses thereof.

Accordingly, these and other various changes or modifications in form and detail of the present invention may also be made therein, again without departing from the true spirit and scope of the invention as defined by the appended claims.

What is claimed is:

1. A system for destabilizing improvised explosive devices, comprising:
    a radio transmitter means for generating a radio signal having (i) a selected carrier frequency, (ii) a selected amplitude modulation frequency, (iii) a selected peak power output, and (iv) a selected transmit duration; and
    a directional antenna means coupled to and fed by said radio transmitter means, for directing said radio signal onto a suspected improvised explosive device,
    wherein said radio signal, upon being directed onto said suspected improvised explosive device, causes detonation of the device.

2. The system of claim 1, wherein said selected carrier frequency is in a range of 1 GHz to 4 GHz.

3. The system of claim 1, wherein said selected amplitude modulation frequency is approximately 50 MHz.

4. The system of claim 1, wherein said selected peak power output is in a range of 1 KW to 2 KW.

5. The system of claim 1, wherein said selected transmit duration is in a range of 50 ms to 100 ms.

6. A system for destabilizing improvised explosive devices, comprising:
    a radio transmitter means for generating a radio signal, having (i) a selected carrier frequency, (ii) a selected amplitude modulation frequency, (iii) a selected peak power output, and (iv) a selected transmit duration, with said radio transmitter means including a power supply, control electronics, and a RF transmitter generator;
    a hand-held directional antenna means coupled to and fed by said radio transmitter means, for directing said radio signal onto a suspected improvised explosive device; and
    a portable backpack for carrying said radio transmitter means,
    wherein said radio signal, upon being directed onto said suspected improvised explosive device, causes detonation of the device.

7. The system of claim 6, wherein said selected carrier frequency is in a range of 1 GHz to 4 GHz.

8. The system of claim 6, wherein said selected amplitude modulation frequency is approximately 50 MHz.

9. The system of claim 6, wherein said selected peak power output is in a range of 1 KW to 2 KW.

10. The system of claim 6, wherein said selected transmit duration is in a range of 50 ms to 100 ms.

11. A method for destabilizing improvised explosive devices, comprising the steps of:

identifying a suspected improvised explosive device;
generating a radio signal having (i) a carrier frequency in a range of 1 GHz to 4 GHz, (ii) an amplitude modulation frequency of approximately 50 MHz, (iii) a peak power output in a range of 1 KW to 2 KW, and (iv) a transmit duration in a range of 50 ms to 100 ms; and
directing said radio signal onto said suspected improvised explosive device, wherein said radio signal, upon being directed onto said suspected improvised explosive device, causes detonation of the device by way of an electromagnetic disruption and triggering effect thereon.

\* \* \* \* \*